United States Patent
Amigo et al.

(10) Patent No.: US 8,135,600 B2
(45) Date of Patent: Mar. 13, 2012

(54) SYSTEM AND METHOD FOR INCREASING CAPACITY IN AN INSURANCE SYSTEM

(75) Inventors: Andrew J. Amigo, Gloucester, MA (US); Kevin F. Barber, Stoughton, MA (US); James W. Hendry, Hopkinton, MA (US); Phyllis J. Keys, Brockton, MA (US); William H. Steinberg, Wellesley, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/022,252

(22) Filed: Feb. 7, 2011

(65) Prior Publication Data

US 2011/0131071 A1 Jun. 2, 2011

Related U.S. Application Data

(63) Continuation of application No. 12/059,169, filed on Mar. 31, 2008, now Pat. No. 7,885,835.

(51) Int. Cl.
*G06Q 40/00* (2006.01)
(52) U.S. Cl. .............................. 705/4; 705/30
(58) Field of Classification Search ............... 705/3–30
See application file for complete search history.

(56) References Cited

U.S. PATENT DOCUMENTS

| | | | | |
|---|---|---|---|---|
| 4,831,526 A * | 5/1989 | Luchs et al. | | 705/4 |
| 5,806,042 A * | 9/1998 | Kelly et al. | | 705/4 |
| 5,873,066 A * | 2/1999 | Underwood et al. | | 705/4 |
| 6,049,773 A | 4/2000 | McCormack et al. | | |
| 7,080,020 B1 | 7/2006 | Klaus | | |
| 7,089,191 B2 * | 8/2006 | Baron et al. | | 705/4 |
| 7,249,038 B2 | 7/2007 | Luedtke | | |
| 7,359,875 B1 * | 4/2008 | Millette et al. | | 705/36 R |
| 7,461,007 B2 | 12/2008 | Lundegren | | |
| 7,685,007 B1 * | 3/2010 | Jacobson | | 705/4 |
| 7,693,731 B1 | 4/2010 | Weber et al. | | |
| 7,742,966 B2 | 6/2010 | Erlanger | | |
| 7,925,523 B1 * | 4/2011 | McConnell et al. | | 705/4 |
| 2006/0242052 A1 | 10/2006 | Long et al. | | |
| 2007/0282641 A1 | 12/2007 | Thomas et al. | | |

OTHER PUBLICATIONS

"Bank One Puts Mortgage Insurance Unit in Gear," CFO Alert. New York: Feb. 8, 1999, vol. 1, Iss. 02; p. 1.
Jody Shenn, "Where's Morgagage Risk? New Answers Emerging," American Banker, New York, NY: May 11, 2005, vol. 170, Iss. 90, p. 1.
Sarah Veysey, "Lloyd's eyes quota-shre limits," Business Insurance, Chicago: Aug. 25, 2003, vol. 37, Iss. 34; p. 13.

* cited by examiner

*Primary Examiner* — Frantzy Poinvil
(74) *Attorney, Agent, or Firm* — Ropes & Gray LLP (57) ABSTRACT

The invention relates, in various aspects to systems, methods, and computer readable media suited for implementing a commonly administered, quota share-based multi-insurer primary insurance system.

26 Claims, 7 Drawing Sheets

SYSTEM AND METHOD FOR INCREASING CAPACITY IN AN INSURANCE SYSTEM

CROSS-REFERENCE TO RELATED APPLICATIONS

This application is a continuation of U.S. Pat. No. 7,885,835, entitled System and Method for Increasing Capacity in an Insurance System, filed on Mar. 31, 2008, the entirety of which is incorporated herein by reference.

BACKGROUND OF THE INVENTION

Quota sharing refers to an insurance arrangement in which multiple insurers share the revenue and liabilities associated with insurance policies. The portion or percentage of revenues and liabilities assumed by in insurer is referred herein to as a "quota share". Quota sharing has been used in reinsurance to reduce the risk portfolios of policies pose to individual primary insurers. For example, a reinsurer, in return for half the premiums received for a portfolio of policies, may agree to reimburse the primary insurer for half the costs arising from claims related to any of the policies in the portfolio.

In other situations, reinsurers have broken down portfolios of policies into segments and have agreed to different quota shares for different segments of the portfolios. In both of these cases, however, the primary insurer is fully liable to the insured for all claims. As far as the customer is concerned, there is only a single insurer.

In other instances, two primary insurers have entered into relationships in which they agree to take on fixed quota shares for an entire book of business. Such relationships lack the flexibility of varying the number of insurers participating in a given policy or the ability to assign quota shares to each policy based on characteristics of the particular policies, insurers, or customers.

One challenge facing certain members of the insurance industry is a shortage of capacity. In order to take on new business, insurers need to maintain sufficient capital to handle potential losses. Lack of capacity leads to inefficiencies in the industry due to duplicative administration costs arising from customers seeking multiple tiers of insurance to fulfill their insurance needs.

Other insurers may have extra capacity with which they want to diversify their exposure without becoming subject matter experts in a particular industry. In addition, other capital holders outside of the insurance industry could contribute their capital to the insurance industry, but lack the expertise, systems, and/or desire to administer insurance policies.

Thus, a need exists in the art for systems and methods that would allow insurers to increase their capacity while keeping administration costs low and retaining flexibility in the liabilities they undertake.

SUMMARY OF THE INVENTION

A system providing common administration of quota shared primary insurance policies addresses this need. More particularly, by having multiple primary insurers issue single insurance policies, with each insurer assuming either, several, but not joint liability, or joint, but not several, liability, for claims related to such policies, additional capital can be leveraged without incurring commensurate increases in overhead. In addition, participants in such a system can avoid exposing themselves to risks they deem undesirable by having the system assign quota shares among participating insurers on a policy-by-policy basis. In this fashion, participants can limit or entirely avoid participating in policies that fail to fit within their desired risk profiles.

In addition, as each insurer is severally, but not jointly, liable for losses, participating insurers can settle claims collectively, or individually. For example, if one participating insurer believes a claim should be challenged while another believes challenging a claim would not be cost-efficient, each can take the action they deem appropriate without implicating the liabilities of the other.

The invention relates, in various aspects to systems, methods, and computer readable media suited for implementing a commonly administered, quota share-based multi-insurer primary insurance system. According to one aspect, the invention relates to a data processing system that includes a memory and a processor in communication with the processor.

The memory stores quota shares for at least two insurers in association with respective ones of a plurality of insurance policies. In one embodiment, the memory stores, for each of the plurality of insurance policies, at least three policy numbers. One of the policy numbers refers to the insurance policy as a whole, and the remaining policy numbers refer to respective assigned shares of the insurance policy among at the least two insurers.

The processor is configured to determine quota shares to assign each of the respective insurance policies on a policy-by-policy basis. In one embodiment, the processor is configured to determine the quota shares to assign to each of the respective insurance policies. For each of the insurance polices, the processor determines the quota shares based at least in part on characteristics of the individual insurance policies. For example, the quota share determination for a given policy may be based on the type of coverage included in the policy, liability limits included in policy, premiums associated with the policy, and whether the policy is a new policy or a renewal policy. The determination, in various implementations, may also be based on characteristics of the entities seeking insurance and/or on characteristics of the insurers. Illustrative insurer characteristics that may be taken into account include, without limitation, insurer underwriting guidelines, insurance capacity, and appetite. Illustrative entity characteristics include, without limitation, the business of the entity, the claims history of the entity, the location of the entity, and any known entity-specific risks. The determination could also be based on a length of time of a relationship among at least two of the insurers. In an alternative embodiment, the system includes a user interface for accepting manual entry of quota shares. As a result of this policy-by-policy quota share assignment, particular insurers may be assigned different quota shares for different policies.

The processor also allocates portions of claim liabilities or premium revenues associated with each of the policies among the at least two insurers according to the stored quota shares associated with the policy. Based on the allocation, the processor outputs a fund transfer amount. The processor may also output insurance quotes and cause a printing device to print an insurance policy and other insurance documents, which indicate the assigned quota shares.

In embodiments in which the processor is configured to allocate portions of received premiums among multiple insurers, the fund transfer amount is a portion of the premium received in relation to a policy that is to be transferred to one of the insurers based on the quota share associated with that insurer for that policy. In some implementations, the premiums received in relation to a given policy may be allocated among two, three, or more insurers. The processor may further be configured to initiate a deposit into an account associated with at least one of the insurers based on the fund transfer amount.

In embodiments in which the processor is configured to allocate portions of the liability among at least two insurers, the funds transfer amount is a portion of a claim liability allocated to at least one of the at least two insurers based on the quota share associated with the at least one insurer and the policy. In one embodiment, the processor is configured to generate a report for at least one of the insurers including a total of claim liabilities allocated to the insurer. In another embodiment, the processor is configured to initiate a payment from an account associated with one of the at least two insurers to a claimant based on the fund transfer amount.

According to another aspect, the invention relates to a computer readable medium that stores computer executable instructions. Upon execution on a processor, the computer executable instructions cause the processor to carry out a method of administering a plurality of insurance policies. The method includes determining quota shares to assign each of the plurality of insurance policies for at least two participating insurers. For each of the insurance polices, the quota shares are determined based at least in part on characteristics of the respective insurance policies. The determined quota shares are then stored in a memory. The method further includes allocating portions of a claim liability or a received premium associated with at least one of the insurance policies among the at least two insurers according to the stored quota shares associated with the at least one insurance policy. In addition the computer executable instructions cause the processor to output a fund transfer amount based on the allocation.

According to another aspect, the invention relates to a method of administering a plurality of insurance policies. The method includes determining quota shares to assign each of the plurality of insurance policies for at least two participating insurers. For each of the insurance polices, the quota shares are determined based at least in part on characteristics of the respective insurance policies. The determined quota shares are then stored in a memory. The method further includes allocating portions of a claim liability or a received premium associated with at least one of the insurance policies among the at least two insurers according to the stored quota shares associated with the at least one insurance policy. The method then includes outputting a fund transfer amount based on the allocation.

BRIEF DESCRIPTION OF THE DRAWINGS

The invention may be better understood from the following illustrative description with reference to the following drawings.

DESCRIPTION OF CERTAIN ILLUSTRATIVE EMBODIMENTS

To provide an overall understanding of the invention, certain illustrative embodiments will now be described, including systems and methods for implementing a commonly administered, quota share-based multi-insurer primary insurance program. However, it will be understood by one of ordinary skill in the art that the methods and systems described herein may be adapted and modified as is appropriate for the application being addressed and that the systems and methods described herein may be employed in other suitable applications, and that such other additions and modifications will not depart from the scope hereof.

Figure 1A:
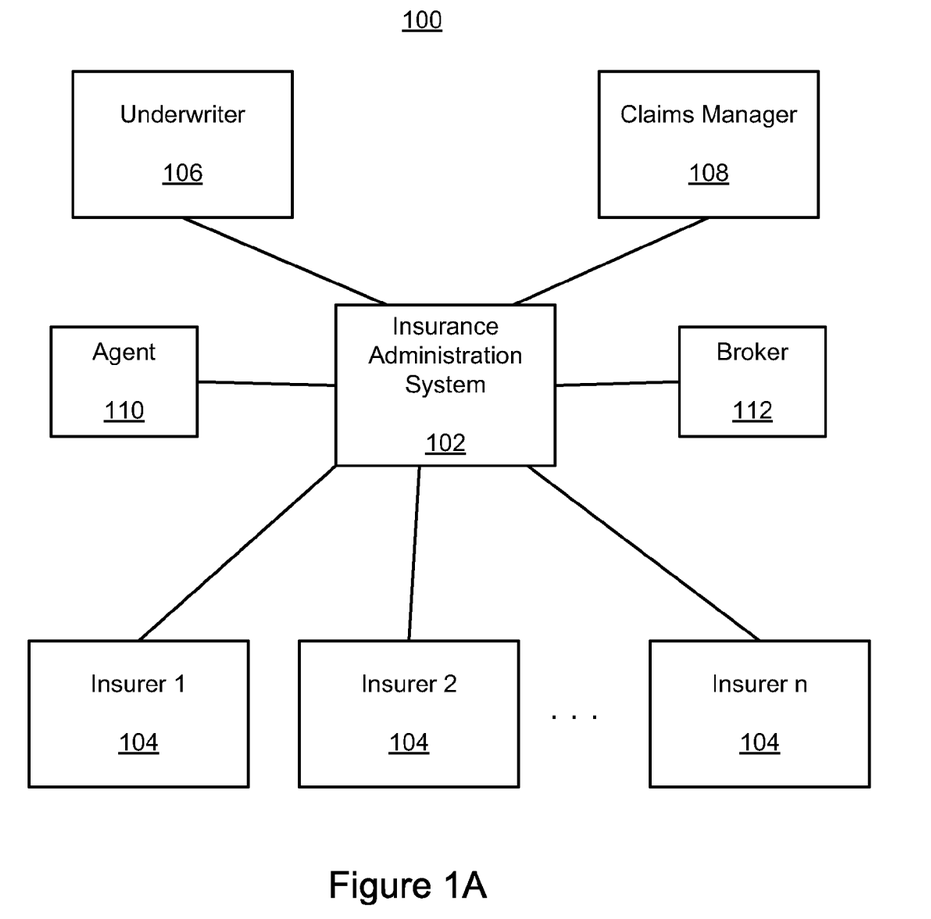
FIG. 1A is a block diagram of a system for insuring customers, according to a illustrative embodiment of the invention.

FIG. 1A is a block diagram of a system 100 for insuring customers, according to a illustrative embodiment of the invention. The system includes an insurance administration system 102, multiple insurers 104, an underwriter 106, a claims manager 108, an insurance agent 110, and an insurance broker 112. The insurance administration system 102 serves as an independent service provider to the insurance providers 104 in administering insurance policies for which at least two of the insurers 104 share received premiums and primary responsibility for claims. The functionality of the insurance administration system 102 is described further in relation to FIGS. 2 and 4-6.

The insurance administration system 100 utilizes an underwriter 106 for underwriting new and renewal policies and a claims manager 108 for evaluating and managing claims related to administered policies. The underwriter 106 and claims manager 108, in one embodiment, are not affiliated with any of the insurers 104. In other embodiments, the underwriter 106 and claims manager 108 are affiliated with one of the insurers 104. In still other embodiments, the insurance administration system includes multiple underwriters 106 and/or claims managers 108. In these embodiments, one or more of the underwriters 106 and/or claims managers 108 are affiliated with one or more of insurers 104. Still other underwriters 106 and claims managers 108 may be fully independent.

The insurance agent 110 and insurance broker 112 may also be affiliated with one or more of the insurers 104, or they may be independent. The insurance agent 110 and broker 112 provide business opportunities to insurance administration system 102. The insurance administration system 102 can then offer a quote for insurance coverage to be shared by one or more combinations of at least two of the insurers 104. The insurers 104 grant the insurance administration system 102 the authority to bind them to policies offered through the insurance administration system 102 so long as the insurance administration system 102 applies underwriting guidelines approved by the respective insurers 104. As a result, if a customer accepts a quote presented by the insurance administration system 102, the insurance administration system 102 can bind the policy for the insurers 104 to issue.

The insurers 104, underwriter 106, claims manager 108, agent 110, and broker 112 may communicate with the insurance administration system 102 via network connections, for example, over the Internet or other public or private wide or local area network.

Figure 1B:
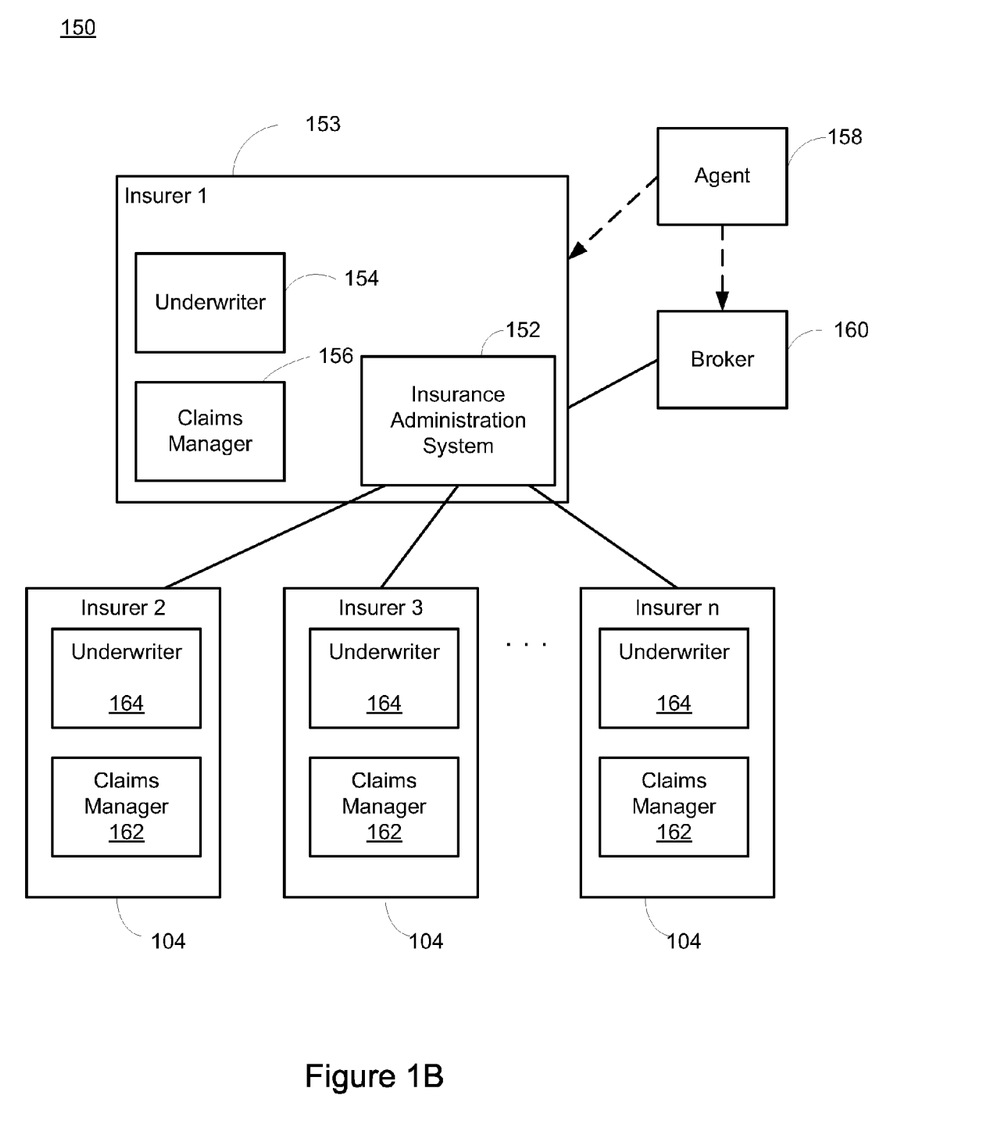
FIG. 1B is a block diagram of a second system for insuring customers, according to a illustrative embodiment of the invention.

FIG. 1B is a block diagram of a second system 150 for insuring customers, according to an illustrative embodiment of the invention. In contrast to the system 100, in the second system 150, an insurance administration system 152 is directly operated by one of the insurers 104, referred to herein as the administering insurer 153. Thus, the insurance administration system 152 primarily utilizes an underwriter 154, a claims manager 156, agents 158, and/or brokers 160 directly affiliated with the administering insurer 153. In certain circumstances, for example, if the claims manager 156 obtains an evaluation of the claim that indicates it represents a liability that is greater than a threshold set by one of the non-administering insurers 104, that insurer 104 may utilize an independent claims evaluator or its own claims manager 162 to obtain another evaluation of the claim. Similarly, in underwriting, if the evaluation of a proposed policy by the underwriter 154 affiliated with the administering insurer 153 meets criteria set by one of the non-administering insurers 104, that insurer 104 may have its own underwriter 164 conduct an independent evaluation of the proposed policy. It should be noted that the non-administering insurers need not have their own underwriters or 164 or claims manager 162. For example in FIG. 1B, insurer 3 does not have its own underwriter or claims manager, and relies fully on the underwriter 154 and claims manager 156 of the administering insurer 153. Generally, however, the operation of the insurance administration system 152 is substantially the same as the operation of the insurance administration system 102 of FIG. 1A.

Figure 2:
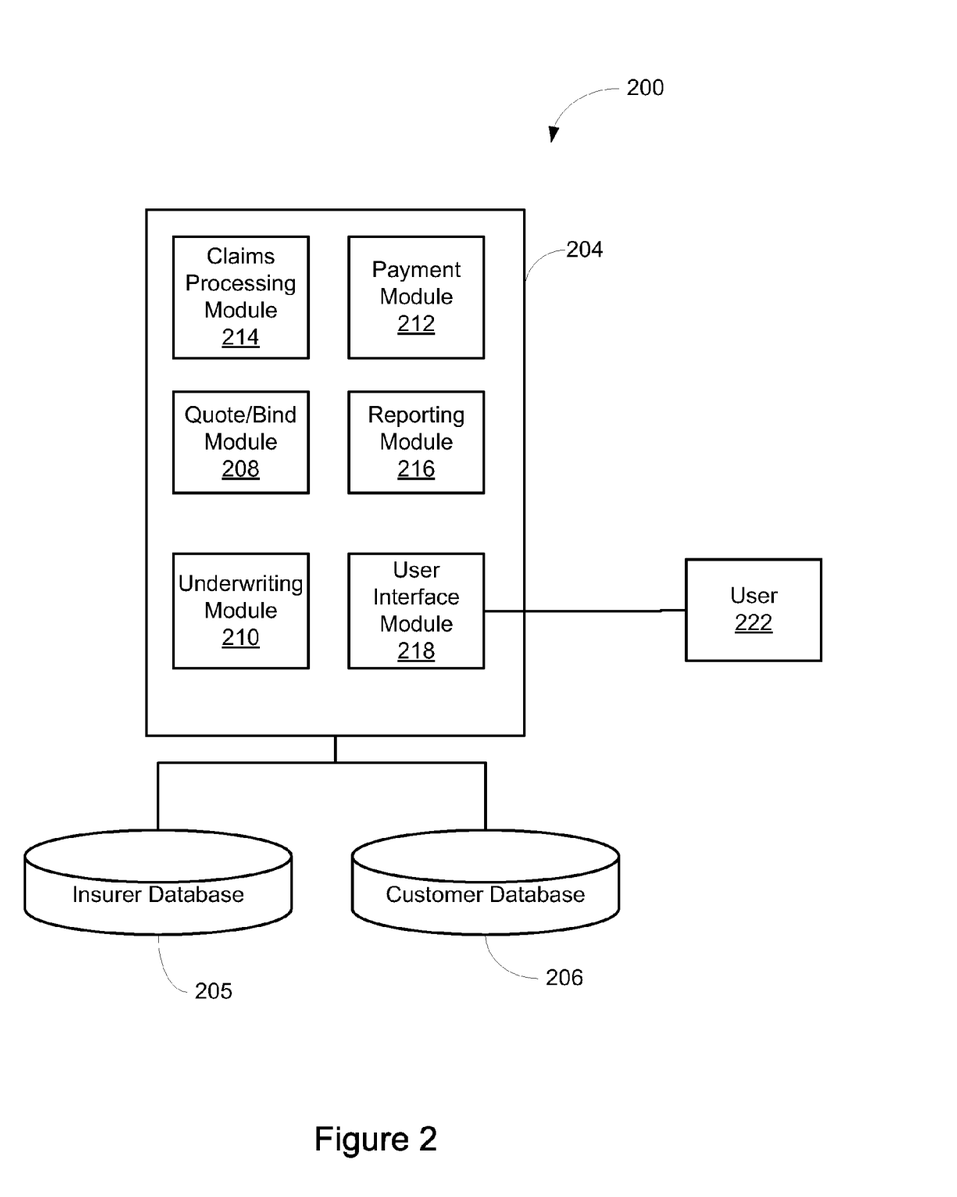
FIG. 2 is a block diagram of an insurance administration system, according to a illustrative embodiment of the invention.

FIG. 2 is a block diagram of an insurance administration system 200, such as the insurance administration systems 102 and 152 of FIGS. 1A and 1B, according to an illustrative embodiment of the invention. The insurance administration system 200 includes an administration application 204, an insurer database 205, and a customer database 206. Together, these components operate to provide common administration of insurance policies for which multiple insurers 104 share premium-derived revenue and either, severally, but not jointly share, or jointly, but not severally, share, in the liability associated with claims arising in relation to such policies.

The administration application 204 is preferably a software application coded in C, C++, JAVA, or other programming language known in the art. In one embodiment, the administration application includes a Quote/Bind module 208, an underwriting module 210, a payment module 212, a claims processing module 214, a reporting module 216, and a user interface module 218.

The quote/bind module 208 of the administration application 204 is responsible for determining which, if any, of the insurers will share the revenue and liabilities associated with an insurance policy. For a smaller policy, the policy may be issued by only a single insurer. Insurers that share in the revenue and liability associated with a particular insurance policy are referred to herein as "participating insurers." The quote/bind module 208 also determines how the revenues and liabilities will be shared, as well as the total premium to be collected in relation to the policy. Finally, quote/bind module 208 outputs a quote to an agent, broker, employee, or customer including the determined information as an offer for insurance. Upon acceptance of the quote, the quote/bind module 208 binds a policy reflecting the arrangement set forth in the quote.

Figure 3:
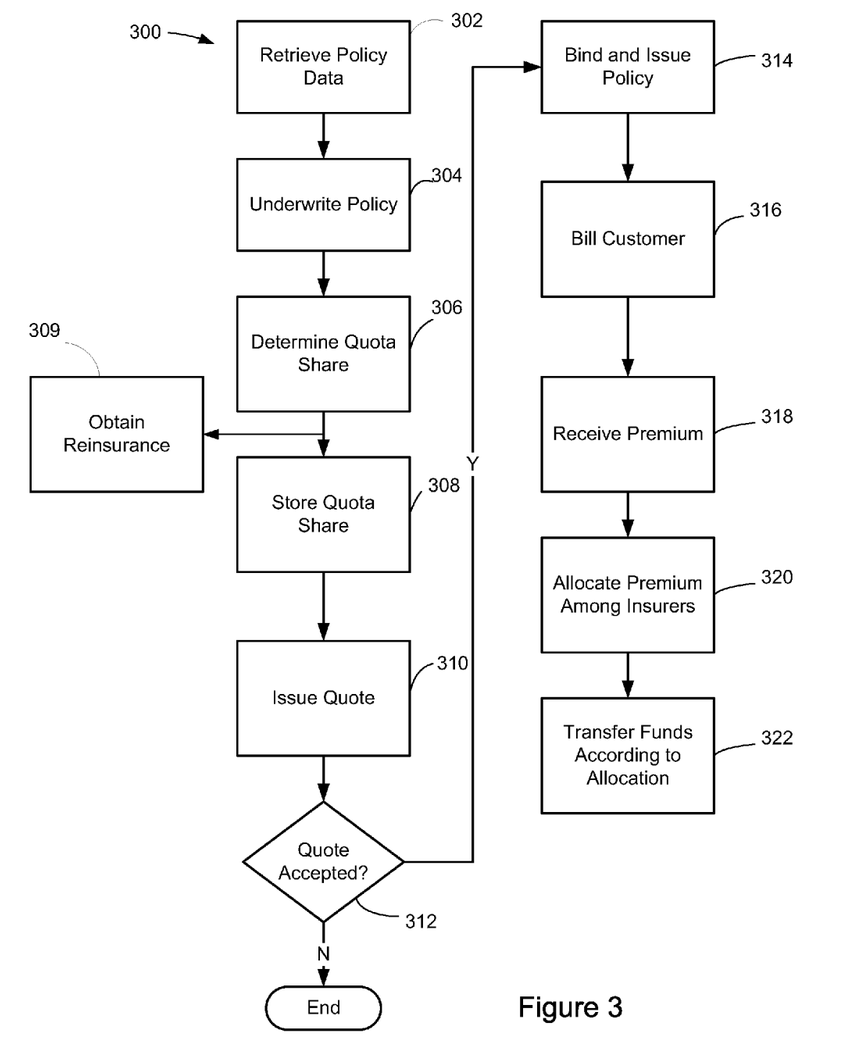
FIG. 3 is a flow chart of a method of binding an insurance policy, according to a illustrative embodiment of the invention.

FIG. 3 depicts a method of binding an insurance policy 300, as may be implemented by the quote/bind module 208 of FIG. 2. The method 300 begins with the quote/bind module obtaining data related to a policy to be quoted (step 302). The policy data may be data related to a newly requested policy, a request for a policy adjustment, or a request to renew an expiring policy. The policy data includes data about the customer, the requested coverages, and associated limits. If the policy is an existing policy with existing quote sharing relationship in place among multiple insurers 104, the policy data also includes the existing quota shares associated with the policy. The quote/bind module 208 obtains the policy data directly from the customer, from an agent or broker or from the customer database 206.

The quote bind module 208 then underwrites the proposed policy (step 304) by invoking the underwriting module 210. The underwriting module 210 evaluates the proposed policy in light of predetermined underwriting guidelines. In general, the underwriting module 210 outputs a rating associated with policy and/or an associated premium. Additional details regarding the underwriting process are described further below in relation to FIG. 4.

Assuming that the policy meets the minimum standards for at least one participating insurer, the quote/bind module 208 determines quota shares (step 306) to apply to the proposed policy. In addition, if, as in some embodiments, the underwriting module 208 outputs a rating, but not a premium, the quote/bind module 208 prices the policy at this stage, too. The quote/bind module 208 may determine the quota shares based on several factors including, in some embodiments, the underwriting results. The following are illustrative examples of how various implementations of the quote/bind module 208 determine the quota shares.

EXAMPLE 1

Relationship Length Quota Share Assignment

In a first illustrative implementation, the quote/binding module 208 determines the quota shares based on the amount of time one of the insurers has been insuring the customer in the proposed policy. This implementation is particularly suitable for use in administration applications 204 operating on insurance administration systems such as insurance administration system 152 of FIG. 1B. In such systems, as the underwriting is carried out by an underwriter associated with the administering insurer 153, the initial risk associated with a policy may be allocated entirely, or mostly, to the administering insurer 153. For example, in the case of a proposed new policy, the quote/binding module 208 assigns 100% of the revenue and risk associated with the new policy to the administering insurer 153. Alternatively, for a new policy, the quote/bind module may assign quota shares of about 75% to about 95% to the administering insurer 153, and the remaining 5%-25% may be split among one or more non-administering insurers 104. Then, each year, as the policy is renewed, the quote/bind module 208, can re-distribute the quota shares among the insurers sharing the revenue and risk.

EXAMPLE 2

Relative Capacity Quota Share Assignment

In a second illustrative implementation, the quote/binding module 208 determines the quota sharings based on the relative capacities of the participating insurers to take on new risk. Based on, e.g., the size, capitalization, and other obligations of an insurer, each insurer may be willing to write varying levels of new business. Consider, for example, insurer A has $25 M in capacity to write, and insurer B has $75 M in capacity. In this scenario, the quote/binding module 208 would assign quota shares of 25% and 75% to Companies A and B, respectively. Capacity data for each insurer is stored in the insurer database 205.

EXAMPLE 3

Variable Capacity Limit Quota Share Assignment

In a third illustrative implementation similar to the second, insurers maintain capacity limits for certain risk levels. For example, an insurer may maintain a lower capacity for writing higher risk policies than lower risk policies. In such instances, quota share assignments are tied to the output of the underwriting module 210. Alternatively, insurers may set capacity limits based on specific risks. For example, an insurer may set a limit on the coverage it will write for customers located in a particular geographical area, e.g., a specific flood zone, such that a single incident is unlikely to result in overly burdensome losses for that insurer. Similarly, insurers may set capacity levels based on customer business activity. For example, an insurer may set a total liability capacity for insuring chemical companies or construction companies. Based on these distinct capacity limits, the quote/bind module 208 assigns quota share levels among insurers based on their relative capacities to insure the particular risk. If doing so would exceed the capacity of any of the participating insurers, that insurer's participation would be capped at its capacity threshold. Capacity data for each insurer is stored in the insurer database 205.

EXAMPLE 4

Absolute Liability Limit Quota Share Assignment

In a third illustrative implementation, the quote binding module 208 assigns quota shares according to absolute liability limits set by one or more the participating insurers. Consider the following: Insurer A agrees to share equally in liability for any given policy up to a total of $1 M. Insurer B agrees to take on any necessary share such that together insurers A and B can fully insure a customer. If a customer requests $2 M in coverage, quote/binding module 208 assigns a quota share of 50% to insurers A and B. If a customer requests $3 M in coverage, quote binding module 208 assigns quota shares of about 33% and 67% to insurers A and B, respectively. Liability limit data for each insurer is stored in the insurer database 205.

EXAMPLE 5

Variable Liability Limit Quota Share Assignment

This implementation is similar to that of the implementation described in example 3, except that the liability limits for a particular insurer vary based on characteristics of the customer or proposed policy. For example, an insurer may set different liability limits for different rating categories. Thus, the quote/binding module 208 assigns the quota shares at least in part on the output of the underwriting module 210. Liability limits may also be set based on any of the other criteria mentioned in relation to the setting of total capacity limits, described with respect to Example 2. Liability limit data for each insurer is stored in the insurer database 205.

EXAMPLE 6

Manual Input Quota Share Assignment

In an additional implementation, the quota share assignments are made manually by a system user. The system user may set the quota shares using any of the methodologies described above, or based on other factors including individually negotiated quota sharing arrangements.

The above-described quota share assignment processes may also be combined in a variety of ways without departing from the scope of the invention.

After quota the shares are assigned by the quote/bind module 208, the quote/bind module stores the assigneds in the customer database (step 308). Optionally, the quote/bind module 208, the underwriting module 210, or a separate reinsurance module are employed to obtain reinsurance for one or more of the insurers' quota shares (step 309). Such reinsurance may be obtained for one insurer's quota share independent of any other insurer's quota share. Reinsurance information is stored in the insurer or customer database 205 or 206.

Based on the underwriting and the quota share determinations, the quote bind module 208 issues a quote (step 310) for the proposed policy. The quote includes an identification of the participating insurers and their respective quota shares. In one implementation, the quote is output electronically, for example, via electronic mail or web-based communication, over a network link to a user 222 of the administration application 204. The user 222 may be an insurance agent 110 or 158, an insurance broker 112 or 160, or an insurer employee. Alternatively, the user 222 may be a customer.

If the quote is accepted (at decision block 312), the quote/bind module 208 binds policy (step 314), initiating a policy issuance process that includes printing and forwarding a copy of a policy to the customer. The policy may be printed by a printing device coupled to the insurance administration system 200. The policy includes an indication of the participating insurers and their respective quota shares. Upon binding a policy, the quote/binding module 208 opens multiple account records for the bound policy, each with its own policy number. The first record is an administrative record and relates to the policy as a whole. Each additional record relates to a particular participating insurer's share of the policy. As a result, if a participating insurer wishes to manage a claim for a particular policy independently from other participating insurers, information related to such management can be stored in that in relation to the record corresponding to that insurer's share of the policy. If the quote is rejected (at decision block 312) the method 300 ends, until a revised request for insurance is received.

After a policy is bound (at step 314), the customer is billed for the insurance (step 316). The bill may be issued through an agent 110 or 158 or broker 112 or 160. In one implementation, on a regular basis, agents 110 or 158, or broker 112 or 160, forward a single payment including the sum of premiums collected for multiple policies administered by the insurance administration system 200. This single payment is accompanied by information indicating which policies the collected premiums are related to. In other implementations, the insurance administration system 200 directly bills (step 316) customers for their respective policies.

Upon the insurance administration system 200 receiving premiums (step 318) associated with one or more policies, the administration application 204 allocates the received premiums among the insurers participating in those policies (step 320) via the payment module 212 on a policy-by-policy basis. Premiums are allocated (step 320) based on the quota shares associated with the participating insurers. For example, for an insurer which is assigned a 30% quota share for a particular policy, the payment module 212 allocates to that insurer 30% of premiums received in relation to that policy. The funds may be deposited in a bank account associated with the insurance administration system 200 prior to allocation among participating insurers. The payment module 212 then transfers funds from the system account to bank accounts maintained for the respective participating insurers (step 322). This fund transfer process, in one implementation, includes electronically outputting a fund transfer amount to a bank along with source account and destination account information.

Figure 4:
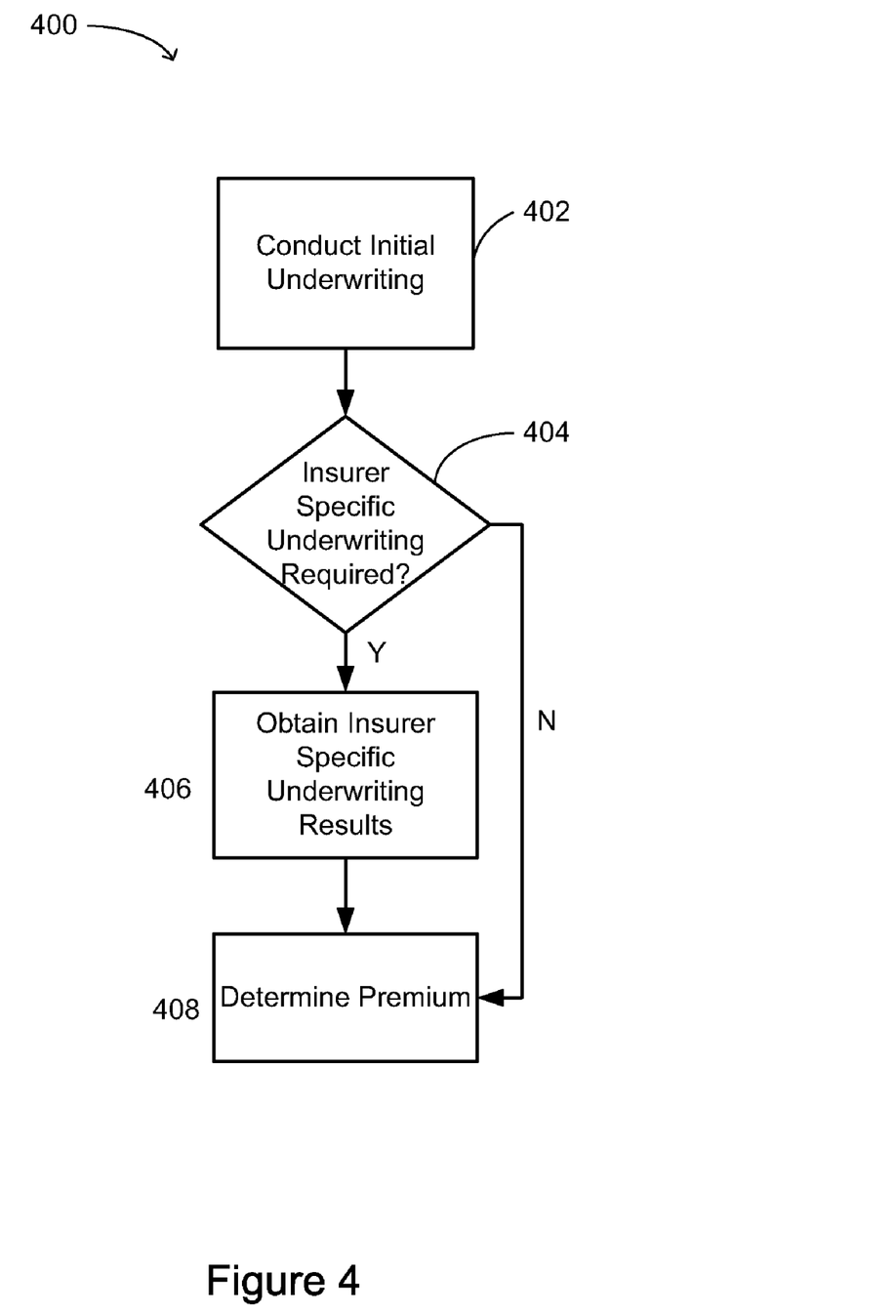
FIG. 4 is a flow chart of a method of underwriting an insurance policy according to a illustrative embodiment of the invention.

FIG. 4 is flow chart of a method of underwriting 400 a proposed insurance policy, as may be carried out by the underwriting module 210 of the administration application 204 of FIG. 2 at step 304 of the method of FIG. 3. While the method 400 is described below in relation to underwriting module 210, the method may also be independently implemented (i.e., outside of the context of an administration application 204) by underwriters engaged to underwrite policies handled by insurance administration systems 102 and 152 of FIGS. 1A and 1B.

Referring to FIGS. 2 and 4, the underwriting method 400 begins with the underwriting module 210 conducting an initial underwriting of a proposed policy (step 402). The underwriting module 210 retrieves information needed to carry out the initial underwriting from the customer database 206. The underwriting module 210 then processes the retrieved data using, for example, a rating engine. The rating engine includes a set of underwriting criteria and guidelines to apply to the customer data in light of the requested policy.

Based on the retrieved information and the initial underwriting, the underwriting module determines whether any additional underwriting may be required by specific insurers that may desire to participate in the policy (decision block 404). To aid in this determination, insurers participating in the insurance administration system 200 may store insurer specific criteria in the insurer database 205 related to their underwriting preferences. For example, an insurer may set one or "additional underwriting triggers." If the underwriting module 210 determines one or more additional underwriting triggers have been met (at decision block 404), the underwriting module forwards the proposed policy data to an underwriter affiliated with the corresponding insurer to provide further evaluation (step 406). The following are examples of additional underwriting triggers suitable for use by participating insurers.

EXAMPLE 1

Rating Based Triggers

In this example, an insurer sets a rating threshold. If the underwriting module 210 determines that a policy exceeds the rating threshold, the underwriting module 210 forwards the proposed policy data to an underwriter selected by the insurer for further review. Based on this further underwriting, the insurer may decline to participate in the policy, require a different rating to participate, or require different policy parameters (e.g., limits or exclusions) to participate.

EXAMPLE 2

Quota Share Based Triggers

In this example, an insurer sets a quota share threshold. If the underwriting module 210 determines that a policy exceeds the quota share threshold, the underwriting module 210 forwards the proposed policy data to an underwriter selected by the insurer for further review. Based on this further underwriting, the insurer may decline to participate in the policy, require a different quota share to participate, or require different policy parameters (e.g., limits or exclusions) to participate.

EXAMPLE 3

Customer Characteristic Based Triggers

In this example, an insurer identifies specific characteristics, which if a particular customer has one or more of such characteristics, the insurer requires further underwriting to participate. Such characteristics may include geographic location, industry classification, specific loss history characteristics, etc. If the underwriting module 210 determines that customer requesting a proposed policy possesses any of these characteristics, the underwriting module 210 forwards the proposed policy data to an underwriter selected by the insurer for further review. Based on this further underwriting, the insurer may decline to participate in the policy, require a different rating to participate, or require different policy parameters (e.g., limits or exclusions) to participate.

EXAMPLE 4

Policy Characteristic Based Triggers

In this example, an insurer identifies specific policy characteristics to trigger further underwriting. Such characteristics may include liability limit thresholds, deductible thresholds, inclusion of specific coverages, etc. If the underwriting module 210 determines that a requested policy has any of these characteristics, the underwriting module 210 forwards the proposed policy data to an underwriter selected by the insurer for further review. Based on this further underwriting, the insurer may decline to participate in the policy, require a different rating to participate, or require different policy parameters (e.g., limits or exclusions) to participate.

Certain insurers may utilize combinations of the above triggers without departing from the scope of the invention.

Based on the initial underwritings results, and, if needed, any supplemental underwriting required by specific insurers, the underwriting module determines a premium price (step 408) for the proposed policy according to any premium determination process known in the art.

Referring back to FIG. 2, the administration application 204 also includes a claims processing module 214. The claims processing module 214 is responsible for administering claims filed in relation to insurance policies managed by the insurance administration system 200. The functionality of the claims processing module is best understood in relation the method of claim administering 500 depicted in FIG. 5.

Figure 5:
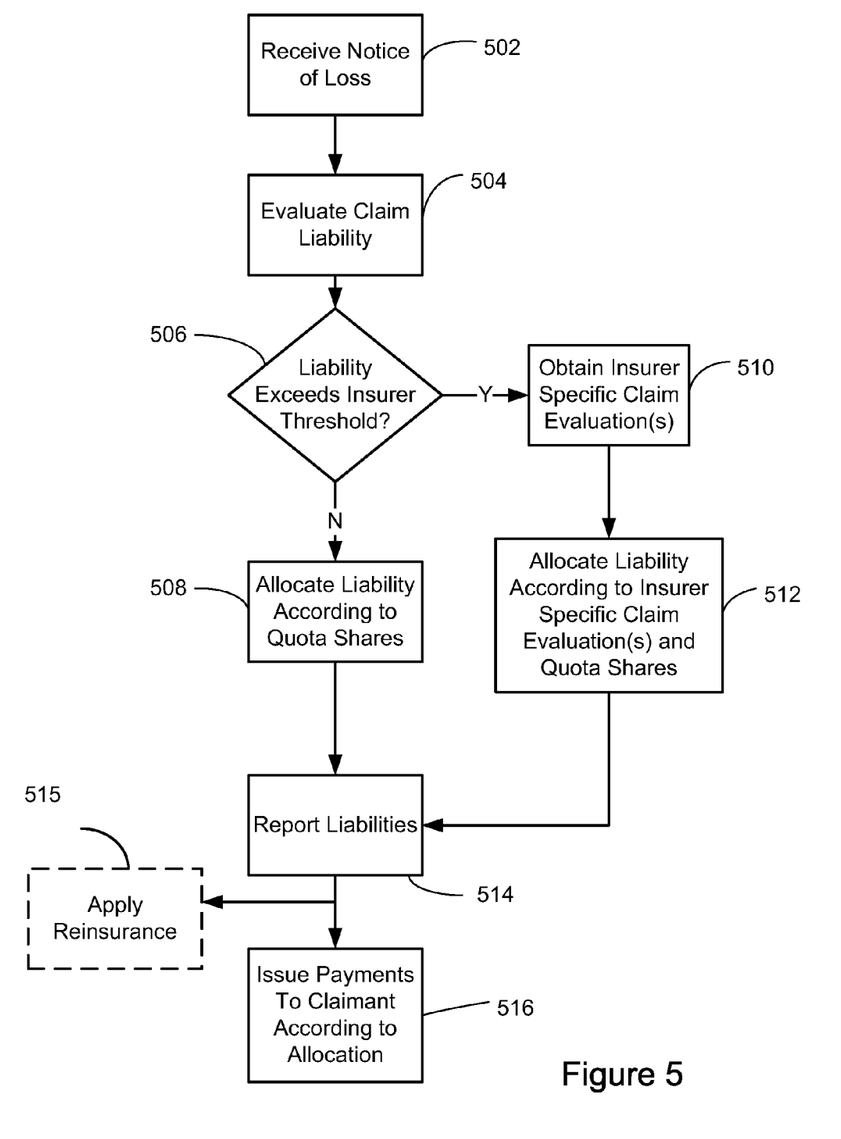
FIG. 5 is a flow chart of a method of claim administration, according to a illustrative embodiment of the invention.

More particularly, FIG. 5 is a flow chart of a claim administration method 500 suitable for implementation by the claims processing module 214, according to an illustrative embodiment of the invention. Referring to FIGS. 2 and 5, the method 500 begins with the insurance administration system 200 receiving a notice of loss associated with a policy administered by the system 200 (step 502). The notice of loss preferably includes preliminary details about the loss and the circumstances surrounding the loss. The claims processing module 214 then forwards the loss information to a claims manager to evaluate the claim (step 504). The claims manager preferably returns a loss magnitude value as well as data that can be used to verify the veracity of the claim and to determine whether the loss is covered by the policy in question.

Assuming the loss is in fact covered by the policy and there the manager fails to find significant indicia of fraud, the claims processing module compares the magnitude of the loss to thresholds set by insurers participating in the policy at decision block 506. Such thresholds may be stored in the insurer database 205. Insurers may store single thresholds, or thresholds that vary based on various parameters, including, for example, the coverage implicated, the type of loss generally (e.g., property versus liability versus bodily injury), or specific type of loss (e.g., soft-tissue injury versus broken bone, etc.) If the magnitude falls below all participating insurer's applicable thresholds, the claims processing module 214 proceeds to allocate the determined liability among the participating insurers based on their respective quota shares (step 508). For example, if three insurers are participating in a policy with equal quota shares, and a claims manager values a claim at $300,000, each insurer is allocated $100,000 of the liability. The insurers are severally, but not jointly, liable for the claim according to their quota shares. That is, no participating insurer is responsible for more than its quota share of the liability. This allows each insurer to settle its portion independently of the remaining participating insurers.

If the claims manager's evaluation of the claim exceeds a participating insurer's threshold, the claims processing module 214 forwards the information obtained about the claim to a claims manager identified by the insurer for an independent evaluation of the claim (step 510). Based on the initial evaluation and the subsequent insurer specific claim evaluation, the claims processing module 214 allocates the claim liability among the participating insurers (step 512). The allocation to each insurer is based on either the initial evaluation, if the results did not exceed the threshold of that particular insurer, or the insurer's independent claim evaluation and each insurer's respective quota share if the initial evaluation surpassed their threshold(s). Consider the following example:

Example Claim Allocation

Insurers A, B, and C issue a several, but not joint, quota shared policy to Customer 1, with quota shares 25%, 25%, and 50%, respectively. Customer 1 then notifies the insurance administration system of a loss. The claims manager affiliated with the insurance administration system obtains an evaluation of the claim, indicating the liability to be a total of $10 M, 50% of which exceeds the $3 M claim liability threshold of Insurer C. Thus, Insurer C conducts its own claim evaluation. The claims manager for Insurer C evaluates the total claim as a $9.5 M claim of which $4.75 M is Insurer C's 50% portion of liability.

The claims processing module 214 then allocates liability to Insurers A, B, and C. As Insurers A and B did not conduct an independent claims evaluation, the claims processing module 214 applies the initial $10 M evaluation in allocating liability, resulting in allocations of $2.5 M (25% of $10 M) to both Insurer A and Insurer B. Claims processing module 214 then applies Insurer C's independent claim evaluation in allocating liability to Insurer C. Thus, the claims processing module allocates $4.75. M (50% of $9.5 M) to Insurer C.

The allocation of liability by the claims processing module 214 is then reported (step 514) to the respective insurers. Allocated liability can be reported immediately upon allocation, from time to time, or according to a regular schedule, e.g., monthly. Such allocations can then be used by the insurers to set their reserves and to include in any requisite regulatory filings. Reports are generated and output by the reporting module 216.

If reinsurance was purchased for any of the participating quota shares (e.g., at step 309), the claims processing module 214 can may also transmit a report and/or bill to the appropriate reinsurer (step 515).

In addition, the claims processing module 214, in conjunction with the payment module 212, can issue payments related to claims (step 516). For example, after allocation of liability, the payment module 214 can output fund transfer amounts associated with each insurer to initiate the printing and sending of checks from accounts associated with the participating insurers to claimants based on their allocated liability. Claimants may include the insured, an injured party, or any other party entitled to a payment under the policy, including, without limitation, medical providers, attorneys, or other service providers addressing the loss. Thus, if no liability thresholds are exceeded requiring insurer specific claims evaluation, the insurance administration system 200 can handle a claim from receipt of a notice of loss through claim settlement without the participating insurer needing to intervene at all.

The reporting module 216 generates a variety of reports for participating insurers in addition to the liability reports described above. Example reports include total exposure reports, exposure reports by policy category, and accounting reports. Such reports may be generated automatically according to a schedule or, alternatively, upon request by a user via the user interface 218. Such reports may be output electronically, e.g., to a display or as an electronic communication, or in paper format via a printing device coupled to the system 200.

Figure 6:
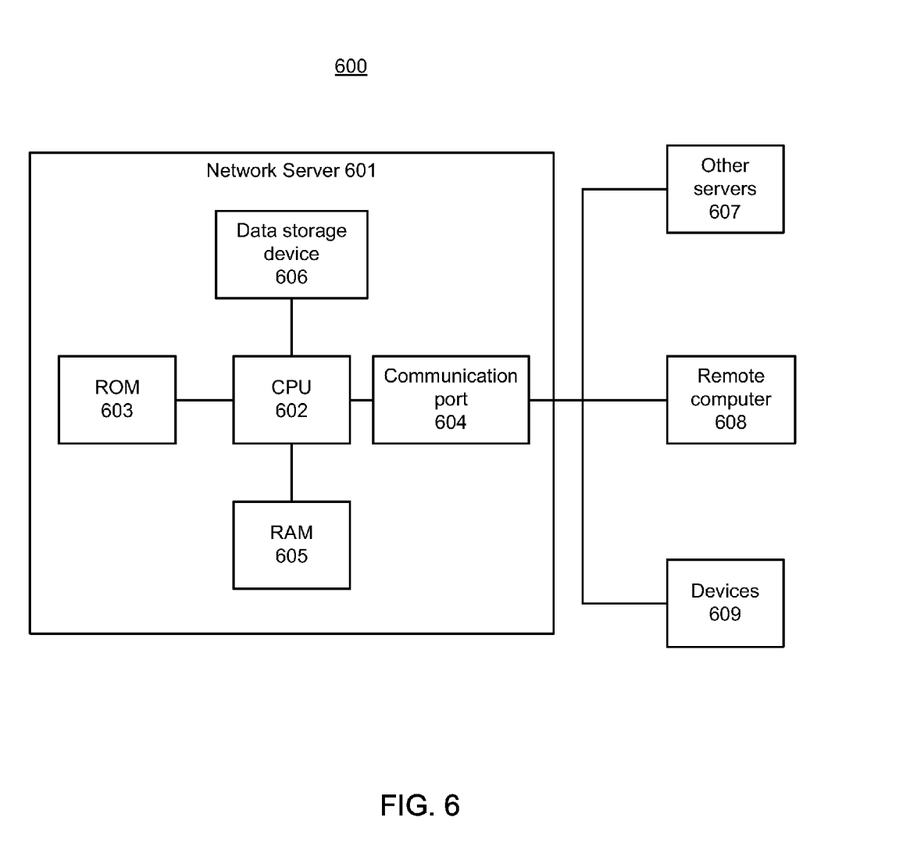
FIG. 6 is a block diagram of a computing architecture suitable for implementation of the insurance administration system of FIG. 2, according to a illustrative embodiment of the invention.

FIG. 6 is a block diagram of a computing architecture suitable for implementing a computing device on which the insurance administration system 200 may be implemented. Computer 601 comprises at least one central processing unit (CPU) 602, at least one read-only memory (ROM) 603, at least one communication port or hub 604, at least one random access memory (RAM) 605, and one or more databases or data storage devices 606. All of these later elements are in communication with the CPU 602 to facilitate the operation of the computer 601. The computer 601 may be configured in many different ways. For example, computer 601 may be a conventional standalone computer or alternatively, the function of computer 601 may be distributed across multiple computing systems and architectures.

Computer 601 may be configured in a distributed architecture, wherein databases and processors are housed in separate units or locations. Some such units perform primary processing functions and contain at a minimum, a general controller or a processor 602, a ROM 603, and a RAM 605. In such an embodiment, each of these units is attached to a communications hub or port 604 that serves as a primary communication link with other servers 607, client or user computers 608 and other related devices 609. The communications hub or port 604 may have minimal processing capability itself, serving primarily as a communications router. A variety of communications protocols may be part of the system, including but not limited to: Ethernet, SAP, SAS™, ATP, BLUETOOTH™, GSM and TCP/IP.

The CPU 602 comprises a processor, such as one or more conventional microprocessors and one or more supplementary co-processors such as math co-processors. The CPU 602 is in communication with the communication port 604 through which the CPU 602 communicates with other devices such as other servers 607, user terminals 608, or devices 609. The communication port 604 may include multiple communication channels for simultaneous communication with, for example, other processors, servers or client terminals.

Devices in communication with each other need not be continually transmitting to each other. On the contrary, such devices need only transmit to each other as necessary, may actually refrain from exchanging data most of the time, and may require several steps to be performed to establish a communication link between the devices.

The CPU 602 is also in communication with the data storage device 606. The data storage device 606 may comprise an appropriate combination of magnetic, optical and/or semiconductor memory, and may include, for example, RAM, ROM, flash drive, an optical disc such as a compact disc and/or a hard disk or drive. The CPU 602 and the data storage device 606 each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wired medium or combination of the foregoing. For example, the CPU 602 may be connected to the data storage device 606 via the communication port 604.

The data storage device 606 may store, for example, (i) a program (e.g., computer program code and/or a computer program product) adapted to direct the CPU 602 in accordance with the present invention, and particularly in accordance with the processes described in detail with regard to the CPU 602; (ii) databases adapted to store information that may be utilized to store information required by the program. Suitable databases include the insurer database 205 and customer data base 208 of FIG. 2.

The program may be stored, for example, in a compressed, an uncompiled and/or an encrypted format, and may include computer program code. The instructions of the program may be read into a main memory of the processor from a computer-readable medium other than the data storage device 606, such as from a ROM 603 or from a RAM 605. While execution of sequences of instructions in the program causes the processor 602 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as underwriting proposed insurance policies, assigning quota shares, and allocating claim liability among participating insurers. The program also may include program elements such as an operating system, a database management system and "device drivers" that allow the processor to interface with computer peripheral devices 609 (e.g., a video display, a keyboard, a computer mouse, etc.).

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 602 (or any other processor of a device described herein) for execution. For example, the instructions may initially be borne on a magnetic disk of a remote computer 608. The remote computer 608 can load the instructions into its dynamic memory and send the instructions over an Ethernet connection, cable line, or even telephone line using a modem. A communications device 604 local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The invention may be embodied in other specific forms without departing from the spirit or essential characteristics thereof. The forgoing embodiments are therefore to be considered in all respects illustrative, rather than limiting of the invention.

What is claimed is:

1. A data processing system comprising:
 a memory for storing:
  quota shares for each of a plurality of primary insurance policies assigned to at least two primary insurers, wherein the quota shares are assigned at least in part based on a type of coverage included in the respective primary insurance policies;
  claim liability data for at least one insurance claim related to at least one of the primary insurance policies; and
  at least one claim liability loss threshold for each of the primary insurers; and a processor configured to:
  allocate received premium payments associated with at least one of the primary insurance policies among the at least two primary insurers according to the quota shares assigned to the at least one of the primary insurance policies;
  receive via a communications port a first evaluation of a claim associated with at least one of the primary insurance policies;
  compare the first evaluation of a first of the at least one claims to the at least one loss threshold for each of the primary insurers related to the first claim;
  forward via the communications port information about the first claim to a primary insurer for an independent claim evaluation if the primary insurer has a loss threshold that is lower than a liability the primary insurer would be allocated for the claim based on the first claim evaluation and the quota share assigned to the primary insurer for an insurance policy related to the first claim; and
  allocate portions of claim liability among the at least two primary insurers based on the independent claim evaluation and the quota shares assigned to the at least one of the primary insurance policies.

2. The data processing system of claim 1, wherein the evaluation of the claim associated with at least one of the primary insurance policies includes information related to at least one of the magnitude of the claim and the veracity of the claim.

3. The data processing system of claim 1, wherein the processor is further configured to output a fund transfer amount based on the allocation of the received premium payments.

4. The data processing system of claim 3, wherein the fund transfer amount comprises at least a portion of the received premium allocated to one of the primary insurers.

5. The data processing system of claim 3, wherein the processor is configured to initiate a deposit into an account associated with one of the at least two primary insurers based on the fund transfer amount.

6. The data processing system of claim 1, wherein the processor is further configured to output a fund transfer amount based on the allocation of the claim liability.

7. The data processing system of claim 6, wherein the fund transfer amount comprises a portion of a claim liability allocated to at least one of the at least two primary insurers.

8. The data processing system of claim 6, wherein the processor is configured to initiate a payment from an account associated with one of the at least two primary insurers to a claimant based on the fund transfer amount.

9. The data processing system of claim 1, wherein the quota shares stored in memory are assigned further based at least in part on at least one of liability limits included in the respective primary insurance policies, premiums associated with the respective primary insurance policies, and whether the primary insurance policies are new or renewal policies.

10. The data processing system of claim 1, wherein the quota shares stored in memory are assigned further based at least in part on characteristics of the at least two primary insurers.

11. The data processing system of claim 1, wherein the quota shares stored in memory are assigned further based at least in part on characteristics of the entities requesting the primary insurance policies.

12. The data processing system of claim 1, wherein the memory stores, for at least one of primary insurance policies, at least three policy numbers, wherein one of the numbers refers to the primary insurance policy as a whole, and the remaining policy numbers refer to the respective quota shares assigned to the primary insurance policy for the at the least two primary insurers.

13. A computer readable medium storing instructions, which when executed by a processor, cause the processor to carry out a method of administering a plurality of primary insurance policies, the method comprising:
  storing in a memory quota shares for each of a plurality of primary insurance policies assigned to at least two primary insurers, wherein the quota shares are assigned at least in part based on a type of coverage included in the respective primary insurance policies;
  storing in the memory claim liability data for at least one insurance claim related to at least one of the primary insurance policies;
  allocating received premium payments associated with at least one of the primary insurance policies among the at least two primary insurers according to the quota shares assigned to the at least one of the primary insurance policies;
  receiving via a communications port a first evaluation of a claim associated with at least one of the primary insurance policies;
  comparing the first evaluation of a first of the at least one claims to at least one loss threshold for each of the primary insurers related to the first claim;
  forwarding via the communications port information about the first claim to a primary insurer for an independent claim evaluation if the primary insurer has a loss threshold that is lower than a liability the primary insurer would be allocated for the claim based on the first claim evaluation and the quota share assigned to the primary insurer for an insurance policy related to the first claim; and
  allocating portions of claim liability among the at least two primary insurers based on the independent claim evaluation and the quota shares assigned to the at least one of the primary insurance policies.

14. The computer readable medium of claim 13, wherein the computer readable instructions cause the processor to base the evaluation of the claim associated with at least one of the primary insurance policies on information related to at least one of the magnitude of the claim and the veracity of the claim.

15. The computer readable medium of claim 13, wherein the computer readable instructions cause the processor to output a fund transfer amount based on the allocation of the received premium payments.

16. The computer readable medium of claim 15, wherein the computer readable instructions causes the processor to initiate a deposit into an account associated with one of the at least two primary insurers based on the fund transfer amount.

17. The computer readable medium of claim 13, wherein the computer readable instructions cause the processor to output a fund transfer amount based on the allocation of the claim liability.

18. The computer readable medium of claim 17, wherein the computer readable instructions causes the processor to initiate a payment from an account associated with one of the at least two primary insurers to a claimant based on the fund transfer amount.

19. The computer readable medium of claim 13, wherein the computer readable instructions cause the processor to generate a report to at least one of the primary insurers including a total of claim liabilities allocated to the primary insurer according to the stored quota shares.

20. A computerized method of administering a plurality of primary insurance policies comprising:
  storing in a memory quota shares for each of a plurality of primary insurance policies assigned to at least two primary insurers, wherein the quota shares are assigned at least in part based on a type of coverage included in the respective primary insurance policies;
  storing in the memory claim liability data for at least one insurance claim related to at least one of the primary insurance policies;
  allocating received premium payments associated with at least one of the primary insurance policies among the at least two primary insurers according to the quota shares assigned to the at least one of the primary insurance policies;
  receiving via a communications port a first evaluation of a claim associated with at least one of the primary insurance policies;
  comparing by a processor the first evaluation of a first of the at least one claims to at least one loss threshold for each of the primary insurers related to the first claim;
  forwarding via the communications port information about the first claim to a primary insurer for an independent claim evaluation if the primary insurer has a loss threshold that is lower than a liability the primary insurer would be allocated for the claim based on the first claim evaluation and the quota share assigned to the primary insurer for an insurance policy related to the first claim; and allocating by the processor portions of claim liability among the at least two primary insurers based on the independent claim evaluation and the quota shares assigned to the at least one of the primary insurance policies.

21. The computerized method of claim 20, wherein the evaluation of the claim associated with at least one of the primary insurance policies is based on information related to at least one of the magnitude of the claim and the veracity of the claim.

22. The computerized method of claim 20, further comprising outputting a fund transfer amount based on the allocation of the received premium payments.

23. The computerized method of claim 22, further comprising initiating a deposit into an account associated with one of the at least two primary insurers based on the fund transfer amount.

24. The computerized method of claim 20, further comprising outputting a fund transfer amount based on the allocation of the claim liability.

25. The computerized method of claim 24, further comprising initiating a payment from an account associated with one of the at least two primary insurers to a claimant based on the fund transfer amount.

26. The computerized method of claim 20, further comprising generating a report to at least one of the primary insurers including a total of claim liabilities allocated to the primary insurer according to the stored quota shares.

* * * * *